United States Patent
Aledo

(10) Patent No.: US 6,481,134 B1
(45) Date of Patent: Nov. 19, 2002

(54) TAG FOR ATTACHING TO A GARMENT HAVING AN ATTRIBUTE AND IDENTIFYING THE ATTRIBUTE TO A PERSON UNABLE TO VISUALLY IDENTIFY THE ATTRIBUTE

(76) Inventor: Alicia Aledo, 101-15 123rd St., Richmond Hill, NY (US) 11419

( * ) Notice: Subject to any disclaimer, the term of this patent is extended or adjusted under 35 U.S.C. 154(b) by 52 days.

(21) Appl. No.: 09/823,228

(22) Filed: Apr. 2, 2001

(51) Int. Cl.[7] .............................. G09F 3/18; G09F 3/10; B32B 33/00; B32B 9/00; G09B 21/00
(52) U.S. Cl. .................. 40/661.09; 40/630; 40/638; 428/40.1; 428/42.1; 434/113
(58) Field of Search ............................. 40/661.04, 630, 40/638, 661.09, 674, 594, 595, 596; 301/5.21; 428/40.1, 42.1, 42.2; 434/113, 114

(56) References Cited

U.S. PATENT DOCUMENTS

| | | | | |
|---|---|---|---|---|
| 2,247,252 A | * | 6/1941 | Price | 40/630 |
| 2,704,267 A | * | 3/1955 | Tilden, Jr. | 301/5.21 |
| 2,799,104 A | * | 7/1957 | Griesinger | 40/638 |
| 4,404,764 A | * | 9/1983 | Wills et al. | 40/124.11 |
| 5,007,191 A | * | 4/1991 | Klein | 40/638 |
| 5,367,809 A | * | 11/1994 | Ross | 40/668 |
| 5,395,137 A | * | 3/1995 | Kim | 40/630 |
| 5,839,215 A | * | 11/1998 | Lasprogata | 40/299.01 |
| 5,933,867 A | * | 8/1999 | Corder | 40/630 |
| 5,967,562 A | * | 10/1999 | Tubbs et al. | 283/114 |
| 6,132,829 A | * | 10/2000 | Kennerly et al. | 428/40.1 |
| 6,286,906 B1 | * | 9/2001 | Nagashima et al. | 301/5.21 |

* cited by examiner

Primary Examiner—S. Joseph Morano
Assistant Examiner—Jason R. Bellinger

(57) ABSTRACT

A tag for attaching to a garment having an attribute and identifying the attribute to a person unable to visually identify the attribute. The tag includes a strip for attaching to the garment, and tactically discernable indicia disposed on the strip and being representative of the attribute of the garment. The strip is divided into a plurality of portions that are break-apartable from each other. The tactically discernable indicia includes a plurality of differently formatted discernable indicia that each represent the same attribute of the garment and include a symbol, Braille, and a letter. Each differently formatted discernable indicia is disposed on a different one of the plurality of portions of the strip. Depending upon which of the plurality of differently formatted discernable indicia the person prefers, an associated one of the plurality of portions of the strip is broken off and attached to the garment.

19 Claims, 1 Drawing Sheet

TAG FOR ATTACHING TO A GARMENT HAVING AN ATTRIBUTE AND IDENTIFYING THE ATTRIBUTE TO A PERSON UNABLE TO VISUALLY IDENTIFY THE ATTRIBUTE

BACKGROUND OF THE INVENTION

1. Field of the Invention

The present invention relates to a tag for attaching to a garment. More particularly, the present invention relates to a tag for attaching to a garment having an attribute and identifying the attribute to a person unable to visually identify the attribute.

2. Description of the Prior Art

Sight impaired or blind people face many challenges and obstacles as they seek to function as sighted persons in society. One problem area usually overlooked is clothing and fashion.

Clothing is mandated to include labels listing the fabrics from which the specific article of clothing is made. The labels may also include care instructions for cleaning or laundering. For the visually impaired such labels cannot be deciphered without assistance. Moreover, such labels do not indicate the color, cut, style, etc. of the clothing, as this information is readily apparent to those not visually impaired.

Furthermore, sight impaired persons may not easily discern relationships between colors and color saturation. For example, complimentary colors and shades of gray range from white through black and such a discernment would be of great advantage.

To overcome these limitations and shortcoming, many times the visually impaired press Braille into slips of paper or plastic which are pinned to articles of clothing to identify their clothes so that they can dress in coordinated colors, cuts, styles, etc. These makeshift labels must, however, either be removed each time the clothing is worn or washed, or else normal usage, such as folding, crumpling, or washing, degrades or destroys the labels so that they no longer are decipherable. Another drawback to self-made labels is that the Braille lettering collects dirt in the indented reverse side.

Another limitation is that when clothing is initially purchased, the store labels cannot be deciphered without sight. Thus, the visually impaired person must have assistance in choosing the proper size, color, cut, style, etc. at the point of purchase. Not only is this inconvenient and requires the aid of a friend or salesperson having the necessary time and patience, but it constrains the independence and freedom for the visually impaired person. In any event, the visually impaired person must them prepare the necessary Braille labels for the articles of clothing purchased.

Numerous innovations for tags have been provided in the prior art that will be described. Even though these innovations may be suitable for the specific individual purposes to which they address, however, they differ from the present invention.

For example, U.S. Pat. No. 4,404,764 to Wills et al. teaches a method of information transfer for sightless persons, sighted persons, and mixed sightless and sighted persons that comprises the steps of choosing and conveying a message from a stock of messages, the messages being set forth on a message medium in optically discernible form and in tactilely discernible form. The forms at least partly correspond. The optical form comprises text and/or pictorial depictions, and the tactile form comprises braille. The method is especially applicable to greeting cards.

Another example, U.S. Pat. No. 5,367,809 to Ross teaches an identifying device for affixation to laundry items and to further identify an owner of the laundry items. The identifying device is a one-piece unit which has a first end and an opposite second end. The first end has a male member formed thereon and the second end has a female member formed thereon. The one-piece unit is hinged between the first end and the second end so that the one piece unit may be folded over the laundry item. The male member of the device is irremovably connected to the laundry item by pushing the male member through the laundry item and joining the male member with the female member. Indicia means are formed on the device to permit identification and matching of pairs of laundry items.

Still another example, U.S. Pat. No. 5,839,215 to Lasprogata teaches a label for attachment to clothing including a template having raised indicia thereon. The label is attached during manufacture of the article of clothing, by the store or other vending establishment, or by the purchaser at any time after acquisition of the clothing. The indicia conveys information relating to characteristics of the clothing. The raised indicia is unaffected by normal usage such as folding, crumpling, or washing of the label. The indicia may comprise lettering, Braille, or both forms of raised writing, as well as designs, logos, or other symbols. One embodiment of the invention includes a template having indicia thereon relating to characteristics of the subject colors. The template comprises a plurality of colors identified by indicia and connected by a line or other device for specifying the relative proportion of the plurality of colors. A preferred way to specify the relative proportions of the plurality of colors includes a scale for tactile representation of the specific color in relation to the plurality of colors.

Yet another example, U.S. Pat. No. 5,967,562 to Tubbs et al. teaches a labeling apparatus connectable to an item for designating a manufacturer's preferred style of an item, the item's color family, and the manufacturer's suggested color contrasting intensity for matching of second items relative to the preferred style. Described is the method of using such labeling apparatus in selecting items matching in style, color family, and color contrasting intensity.

It is apparent that numerous innovations for tags have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a tag for attaching to a garment having an attribute and identifying the attribute to a person unable to visually identify the attribute that avoids the disadvantages of the prior art.

Another object of the present invention is to provide a tag for attaching to a garment having an attribute and identifying the attribute to a person unable to visually identify the attribute that is simple and inexpensive to manufacture.

Still another object of the present invention is to provide a tag for attaching to a garment having an attribute and identifying the attribute to a person unable to visually is identify the attribute that is simple to use.

Briefly stated, yet another object of the present invention is to provide a tag for attaching to a garment having an attribute and identifying the attribute to a person unable to visually identify the attribute. The tag includes a strip for attaching to the garment, and tactically discernable indicia disposed on the strip and being representative of the attribute of the garment. The strip is divided into a plurality of portions that are break-apartable from each other. The tactically discernable indicia includes a plurality of differently formatted discernable indicia that each represent the same attribute of the garment and include a symbol, Braille, and a letter. Each differently formatted discernable indicia is disposed on a different one of the plurality of portions of the strip. Depending upon which of the plurality of differently formatted discernable indicia the person prefers, an associated one of the plurality of portions of the strip is broken off and attached to the garment.

The novel features which are considered characteristic of the present invention are set forth in the appended claims. The invention itself, however, both as to its construction and its method of operation, together with additional objects and advantages thereof, will be best understood from the following description of the specific embodiment when read and understood in connection with the accompanying drawing.

BRIEF DESCRIPTION OF THE DRAWING

The figures of the drawing are briefly described as follows.

Figure 1:
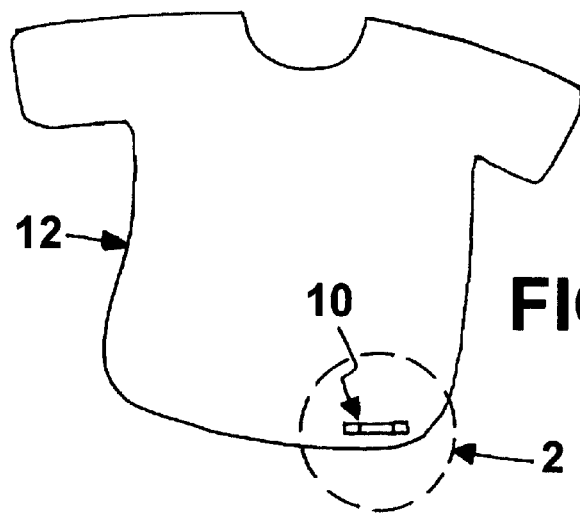
FIG. 1 is a diagrammatic perspective view of the present invention attached to a garment.

LIST OF REFERENCE NUMERALS UTILIZED IN THE DRAWING 10 tag of present invention for attaching to garment 12 having attribute and identifying attribute to person unable to visually identify attribute
12 garment having attribute
14 strip for attaching to garment 12
16 tactically discernable indicia representative of attribute of garment 12 that person is unable to visually identify
18 lowermost surface of strip 14 for attaching to garment 12 having attribute
20 uppermost surface of strip 14
22 pair of end surfaces of strip 14
24 pair of side surfaces of strip 14
26 plurality of portions of strip 14
28 plurality of grooves making plurality of portions 26 of strip 14 break-apartable from each other
30 pair of surfaces of each groove of plurality of grooves in strip 14
32 plurality of differently formatted discernable indicia of tactically discernable indicia 16
34 symbol of plurality of differently formatted discernable indicia 32 of tactically discernable indicia 16
36 Braille of plurality of differently formatted discernable indicia 32 of tactically discernable indicia 16
38 letter of plurality of differently formatted discernable indicia 32 of tactically discernable indicia 16

DETAILED DESCRIPTION OF THE PREFERRED EMBODIMENT

Referring now to the figures, in which like numerals indicate like parts, and particularly to FIG. 1, which is a diagrammatic perspective view of the present invention attached to a garment, the tag of the present invention is shown generally at 10 for attaching to a garment 12 having an attribute and identifying the attribute to a person unable to visually identify the attribute.

Figure 2:
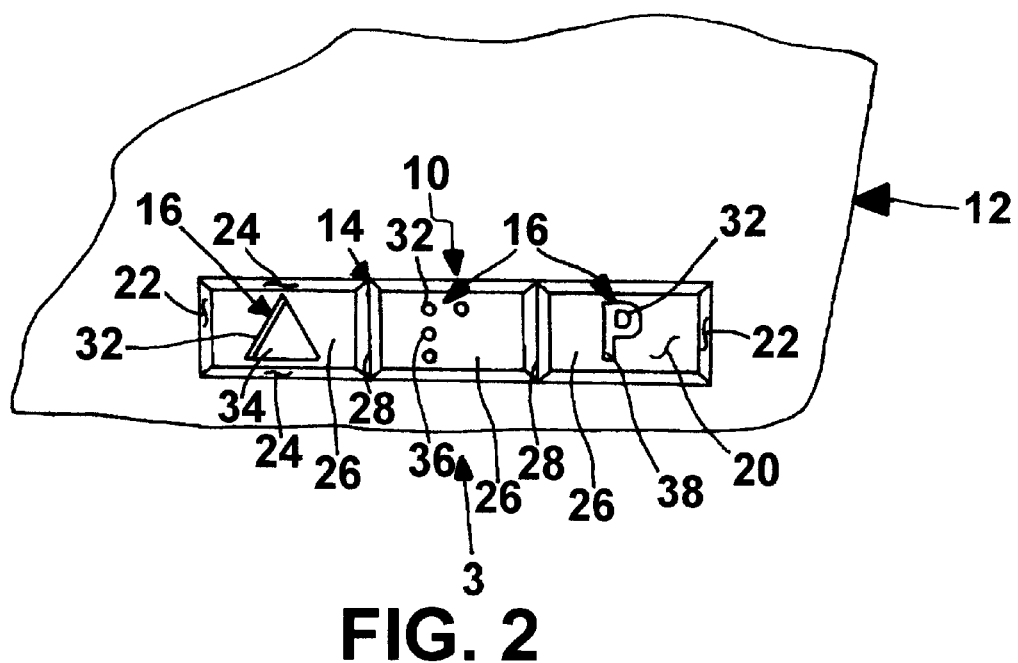
FIG. 2 is an enlarged diagrammatic top plan view of the area generally enclosed by the dotted curve identified by ARROW 2 in FIG. 1 of the present invention.
Figure 3:
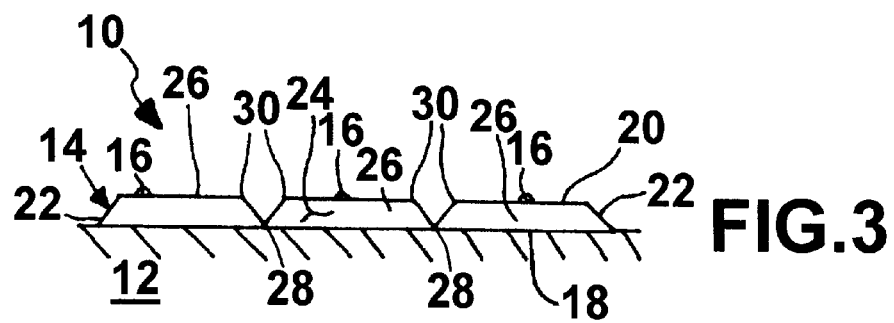
FIG. 3 is a diagrammatic side elevational view taken generally in the direction of ARROW 3 in FIG. 2.

The configuration of the tag 10 can best be seen in FIGS. 2 and 3, which are, respectively, an enlarged diagrammatic top plan view of the area generally enclosed by the dotted curve identified by ARROW 2 in FIG. 1 of the present invention, and a diagrammatic side elevational view taken generally in the direction of ARROW 3 in FIG. 2, and as such, will be discussed with reference thereto.

The tag 10 comprises a strip 14 for attaching to the garment 12, and tactically discernable indicia 16 that is disposed on the strip 14 and is representative of the attribute of the garment 12 that the person is unable to visually identify.

The strip 14 is solid, slender, thin, molded, and made from a material whose structural integrity is not compromised by at least folding, crumpling, and washing.

The strip 14 has a lowermost surface 18 for attaching to the garment 12, an uppermost surface 20 that is disposed above the lowermost surface 18 thereof, a pair of end surfaces 22 that extend upwardly from the lowermost surface 18 thereof to the uppermost surface 20 thereof, and a pair of side surfaces 24 that extend upwardly from the lowermost surface 18 thereof to the uppermost surface 20 thereof and sidewardly from one end surface 22 thereof to the other end surface 22 thereof.

The uppermost surface 20 of the strip 14 is disposed centrally above, is parallel to, and is smaller than, the lowermost surface 18 of the strip 14.

The pair of side surfaces 24 of the strip 14 are longer than the pair of end surfaces 22 of the strip 14, respectively.

Each end surface 22 of the strip 14 is frustum-shaped and are identically shaped to each other.

The pair of end surfaces 22 of the strip 14 incline inwardly, at an angle, from the lowermost surface 18 of the strip 14 to the uppermost surface 20 of the strip 14, towards each other.

Each side surface 24 of the strip 14 is frustum-shaped and are identically shaped to each other.

The pair of side surfaces 24 of the strip 14 incline inwardly, at the angle, from the lowermost surface 18 of the strip 14 to the uppermost surface 20 of the strip 14, towards each other.

The strip 14 is divided longitudinally into a plurality of portions 26 that are frusto-prism-shaped.

The plurality of portions 26 of the strip 14 are break-apartable from each other by a plurality of grooves 28.

The plurality of grooves 28 in the strip 14 extend upwardly from the lowermost surface 18 of the strip 14 to the uppermost surface 20 of the strip 14 and laterally from one side surface 26 of the strip 14 to the other side surface 26 of the strip 14.

The plurality of grooves 28 in the strip 14 are parallel to each other.

Each groove 28 in the strip 14 is V-shaped in lateral cross section and defined by a pair of surfaces 30.

Each surface 30 of each groove 28 in the strip 14 is frustum-shaped and are identically shaped to each other and to each end surface 22 of the strip 14.

The pair of surfaces 30 of a respective groove 28 in the strip 14 incline outwardly, at the angle, from the lowermost surface 18 of the strip 14 to the uppermost surface 20 of the strip 14, away from each other.

The tactically discernable indicia 16 is molded as one-piece with the strip 14.

The tactically discernable indicia 16 is disposed only on the uppermost surface 20 of the strip 14 so as to eliminate an indented reverse side for collecting dirt.

The tactically discernable indicia 16 comprise a plurality of differently formatted discernable indicia 32 that each represent the same attribute of the garment 12 and comprise a symbol 34, Braille 36, and a letter 38.

Each differently formatted discernable indicia 32 is disposed on the uppermost surface 20 of the strip 14, on a different one of the plurality of portions 26 of the strip 14, and depending upon which of the plurality of differently formatted discernable indicia 32 a person prefers, an associated one of the plurality of portions 26 of the strip 14 is broken off and attached to the garment 12.

It will be understood that each of the elements described above, or two or more together, may also find a useful application in other types of constructions differing from the types described above.

While the invention has been illustrated and described as embodied in a tag for attaching to a garment having an attribute and identifying the attribute to a person unable to visually identify the attribute, however, it is not limited to the details shown, since it will be understood that various omissions, modifications, substitutions, and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A tag for attaching to a garment having an attribute and identifying the attribute to a person unable to visually identify the attribute, said tag comprising:

a) a strip for attaching to the garment; and
   b) tactically discernable indicia disposed on said strip and being representative of the attribute of the garment that the person is unable to visually identify;
   wherein said strip has:
   i) a lowermost surface for attaching to the garment;
   ii) an uppermost surface that is disposed above said lowermost surface thereof;
   iii) a pair of end surfaces that extend upwardly from said lowermost surface thereof to said uppermost surface thereof; and
   iv) a pair of side surfaces that extend upwardly from said lowermost surface thereof to said uppermost surface thereof and sidewardly from one end surface thereof to the other end surface thereof.

2. The tag as defined in claim 1, wherein said strip is solid, slender, thin, molded, and made from a material whose structural integrity is not compromised by at least folding, crumpling, and washing.

3. The tag as defined in claim 1, wherein said uppermost surface of said strip is disposed centrally above, is parallel to, and is smaller than, said lowermost surface of said strip.

4. The tag as defined in claim 1, wherein said pair of side surfaces of said strip are longer than said pair of end surfaces of said strip, respectively.

5. The tag as defined in claim 1, wherein each end surface of said strip is frustum-shaped and are identically shaped to each other.

6. The tag as defined in claim 1, wherein said pair of end surfaces of said strip incline inwardly, at an angle, from said lowermost surface of said strip to said uppermost surface of said strip, towards each other.

7. The tag as defined in claim 1, wherein each side surface of said strip is frustum-shaped and are identically shaped to each other.

8. The tag as defined in claim 1, wherein said pair of side surfaces of said strip incline inwardly, at said angle, from said lowermost surface of said strip to said uppermost surface of said strip, towards each other.

9. The tag as defined in claim 6, wherein said strip is divided longitudinally into a plurality of portions that are frusto-prism-shaped.

10. The tag as defined in claim 9, wherein said plurality of portions of said strip are break-apartable from each other by a plurality of grooves.

11. The tag as defined in claim 10, wherein said plurality of grooves in said strip extend upwardly from said lowermost surface of said strip to said uppermost surface of said strip and laterally from one side surface of said strip to the other side surface of said strip.

12. The tag as defined in claim 10, wherein said plurality of grooves in said strip are parallel to each other.

13. The tag as defined in claim 10, wherein each groove in said strip is V-shaped in lateral cross section, and defined by a pair of surfaces.

14. The tag as defined in claim 13, wherein each surface of each groove in said strip is frustum-shaped and are identically shaped to each other and to each end surface of said strip.

15. The tag as defined in claim 13, wherein said pair of surfaces of a respective groove in said strip incline outwardly, at said angle, from said lowermost surface of said strip to said uppermost surface of said strip, away from each other.

16. The tag as defined in claim 1, wherein said tactically discernable indicia is molded as one-piece with said strip.

17. The tag as defined in claim 1, wherein said tactically discernable indicia is disposed only on said uppermost surface of said strip so as to eliminate an indented reverse side for collecting dirt.

18. The tag as defined in claim 9, wherein said tactically discernable indicia comprise a plurality of differently formatted discernable indicia that each represent the same attribute of the garment and comprise:

a) a symbol;
   b) Braille; and
   c) a letter.

19. The tag as defined in claim 18, wherein each differently formatted discernable indicia is disposed on said uppermost surface of said strip, on a different one of said plurality of portions of said strip, and depending upon which of said plurality of differently formatted discernable indicia the person prefers, an associated one of said plurality of portions of said strip is broken off and attached to the garment.

* * * * *